US012129683B2

(12) United States Patent
LaMontagne et al.

(10) Patent No.: US 12,129,683 B2
(45) Date of Patent: Oct. 29, 2024

(54) BREAK-AWAY DOOR HANDLE

(71) Applicant: Hussmann Corporation, Bridgeton, MO (US)

(72) Inventors: Rick M. LaMontagne, Warrenton, MO (US); Ye Tian, Bridgeton, MO (US)

(73) Assignee: Hussmann Corporation, Bridgeton, MO (US)

( * ) Notice: Subject to any disclaimer, the term of this patent is extended or adjusted under 35 U.S.C. 154(b) by 0 days.

(21) Appl. No.: 17/937,070

(22) Filed: Sep. 30, 2022

(65) Prior Publication Data

US 2023/0109417 A1 Apr. 6, 2023

Related U.S. Application Data

(60) Provisional application No. 63/251,352, filed on Oct. 1, 2021.

(51) Int. Cl.
*E05B 1/00* (2006.01)
*E05B 65/00* (2006.01)

(52) U.S. Cl.
CPC ........ *E05B 1/0015* (2013.01); *E05B 65/0042* (2013.01)

(58) Field of Classification Search
CPC ... E05B 1/0015; E05B 65/0042; A47B 95/02; A47B 2095/021; A47B 2095/022; A47B 2095/023; B60R 1/076
See application file for complete search history.

(56) References Cited

U.S. PATENT DOCUMENTS

| | | | | | |
|---|---|---|---|---|---|
| 4,976,455 | A * | 12/1990 | Brammer, Sr. | B60P 3/36 | 403/93 |
| 5,332,186 | A * | 7/1994 | Lutz | B60R 1/076 | 248/479 |
| 5,647,095 | A * | 7/1997 | Takimoto | A45C 13/26 | 16/405 |
| 6,375,291 | B1 * | 4/2002 | Nam | E05C 19/161 | 312/405 |
| 6,574,921 | B2 * | 6/2003 | Zimmermann | E05F 13/02 | 49/460 |
| 6,843,468 | B2 * | 1/2005 | Marshall | A47K 3/003 | 256/65.16 |
| 6,974,134 | B1 * | 12/2005 | Macri | E05B 1/0015 | 16/412 |
| 7,007,366 | B1 * | 3/2006 | Eby | B60P 3/36 | 29/434 |
| 7,249,395 | B2 * | 7/2007 | Brammer, Jr. | E05B 1/0015 | 16/412 |

(Continued)

*Primary Examiner* — Jeffrey O'Brien
(74) *Attorney, Agent, or Firm* — Michael Best & Friedrich LLP

(57) ABSTRACT

A handle for a door. The handle includes a door mount that has a first end and a second end with a first mating feature, and a handle section that is coupled to the door mount by a fastener. The handle section has a second mating feature that is complementary to the first mating feature. The handle section is in a first state when the first mating feature and the second mating feature are engaged with each other, and the handle section is in a second state when the first mating feature and the second mating feature are at least partially disengaged from each other. In response to a force acting on the handle section, the handle section is movable from the first state to the second state.

19 Claims, 10 Drawing Sheets

(56) References Cited

U.S. PATENT DOCUMENTS

| | | | | |
|---|---|---|---|---|
| 7,685,675 | B2 * | 3/2010 | Jung | E05B 1/0015 16/110.1 |
| 8,108,972 | B2 * | 2/2012 | Bae | A47B 95/02 16/412 |
| 9,366,471 | B2 * | 6/2016 | Allen | F25D 23/028 |
| 9,926,970 | B2 * | 3/2018 | Lang | F16M 13/02 |
| 10,513,223 | B2 * | 12/2019 | Umino | B60R 1/076 |
| 10,925,446 | B2 * | 2/2021 | Edwards | A47K 17/024 |
| 11,365,558 | B2 * | 6/2022 | Simon | E05B 63/0056 |
| 11,554,704 | B2 * | 1/2023 | Tinghitella | B60N 3/023 |
| 11,619,438 | B2 * | 4/2023 | Allgeier | F25D 23/028 312/326 |
| 2007/0204437 | A1 | 9/2007 | Hartmann et al. | |
| 2007/0251053 | A1 * | 11/2007 | Miller | A47K 17/024 16/110.1 |
| 2008/0282505 | A1 * | 11/2008 | Kim | E05B 17/0033 312/405 |
| 2009/0282651 | A1 * | 11/2009 | Yang | A47B 95/02 16/412 |
| 2021/0214966 | A1 * | 7/2021 | Odom | E05B 1/0015 |
| 2021/0324658 | A1 * | 10/2021 | Cronin | A61L 2/238 |
| 2021/0363779 | A1 * | 11/2021 | Bennett | E05B 1/0015 |
| 2022/0186522 | A1 * | 6/2022 | Clemons | E05B 1/0015 |

* cited by examiner

BREAK-AWAY DOOR HANDLE

BACKGROUND

The present invention relates to a door handle and, more particularly, to a door handle for merchandisers.

Existing merchandisers generally include structure that defines a product support or display area for supporting and displaying product (e.g., for stocking or selection of product. Merchandisers are generally used in retail food store applications such as grocery or convenience stores or other locations where food product is displayed in a refrigerated condition. Some merchandisers include doors that enclose product in a product display area. Existing doors include handles that are fixed to the door frame or to the main body of the door (e.g., the glass panel). Impact from a cart or other object on existing door handles may break the handle or damage the door.

SUMMARY

In one aspect, the invention provides handle for a door. The handle includes a door mount that has a first end and a second end with a first mating feature, and a handle section that is coupled to the door mount by a fastener. The handle section has a second mating feature that is complementary to the first mating feature. The handle section is in a first state when the first mating feature and the second mating feature are engaged with each other, and the handle section is in a second state when the first mating feature and the second mating feature are at least partially disengaged from each other. In response to a force acting on the handle section, the handle section is movable from the first state to the second state.

In another aspect, the invention provides a handle including a first mount, a second mount, and a handle section that is elongated along an axis and that is coupled to and between the first mount and the second mount. The handle section has a state in which the handle section is aligned with the first mount and the second mount, and the handle section movable relative to the first mount and the second mount in response to a force acting on the handle section in a direction skewed relative to the axis.

In another aspect, the invention provides a handle for a door. The handle includes a door mount and a handle section that extends along an axis and that is coupled to the first door mount by a hinge disposed between the door mount and the handle section. The handle section has a first state in which the handle section is aligned with the door mount, and a second state in which the handle section is unaligned with the door mount. The handle movable relative to the door mount about the hinge between the first state and the second state in response to a force acting on the handle section in a direction that is skewed relative to the axis.

Other aspects of the invention will become apparent by consideration of the detail description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
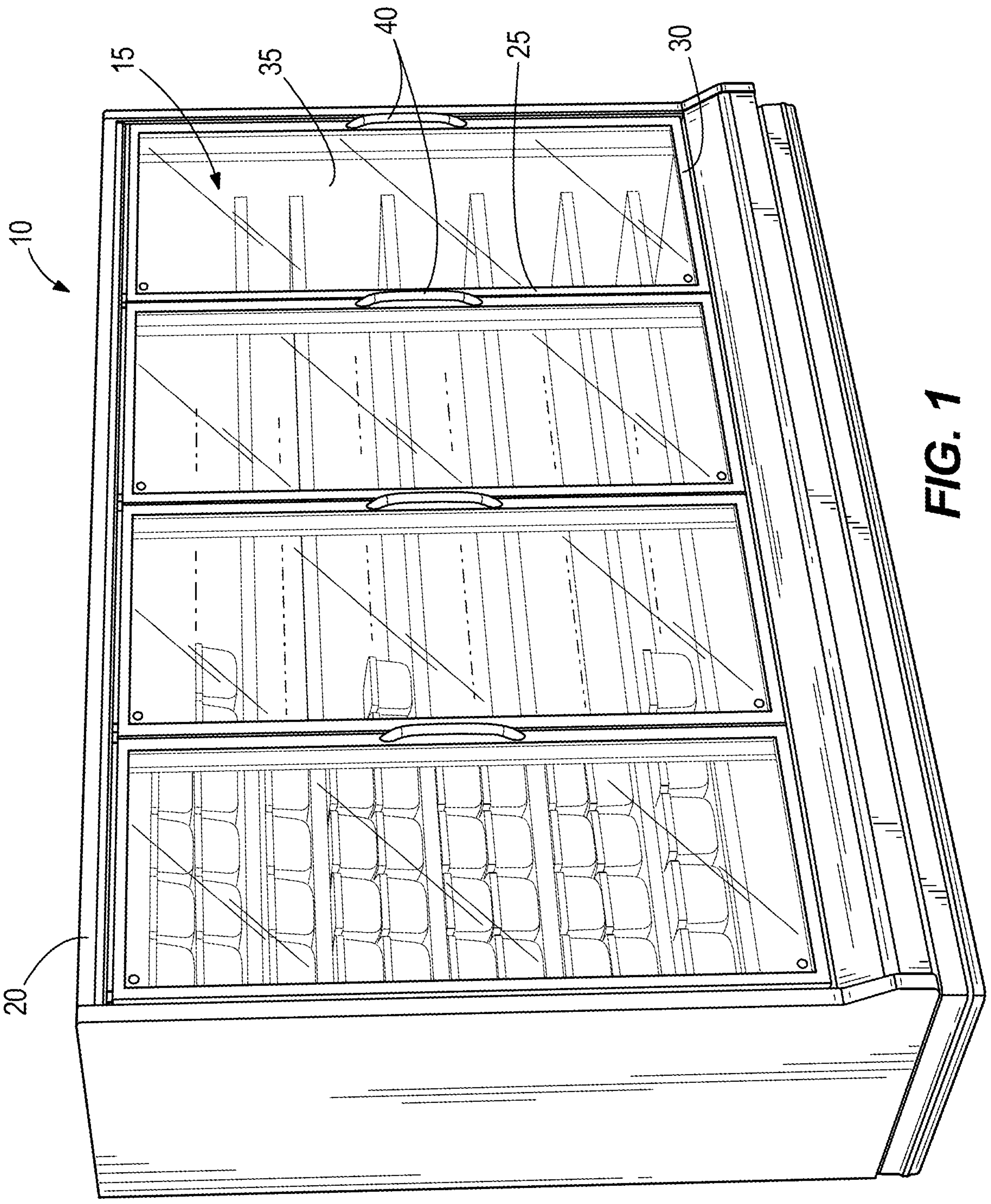
FIG. 1 is a perspective view of a merchandiser including a product display area accessible via doors, and handles coupled to the doors and embodying the invention.

FIG. 1 illustrates a merchandiser 10 (e.g., refrigerated, non-refrigerated, ambient, or heated) that may be located in a supermarket, a convenience store, or other suitable retail location (not shown) and that defines a product display area 15 for presenting fresh food, frozen food, beverages, or other product to consumers. The merchandiser 10 includes a case 20 that has access openings and doors 25 that are attached to the case 20 to provide access to the product display area 15 through the access openings. The illustrated merchandiser 10 has four access openings and four doors 25, although fewer or more access openings and doors are possible and considered herein. Each door 25 includes a door frame 30 and a door panel 35. The door panel 35 includes one or more glass panes to allow product to be viewed when the door 25 is closed. It will be appreciated that the door panel 35 may be made of material other than glass.

Figure 2:
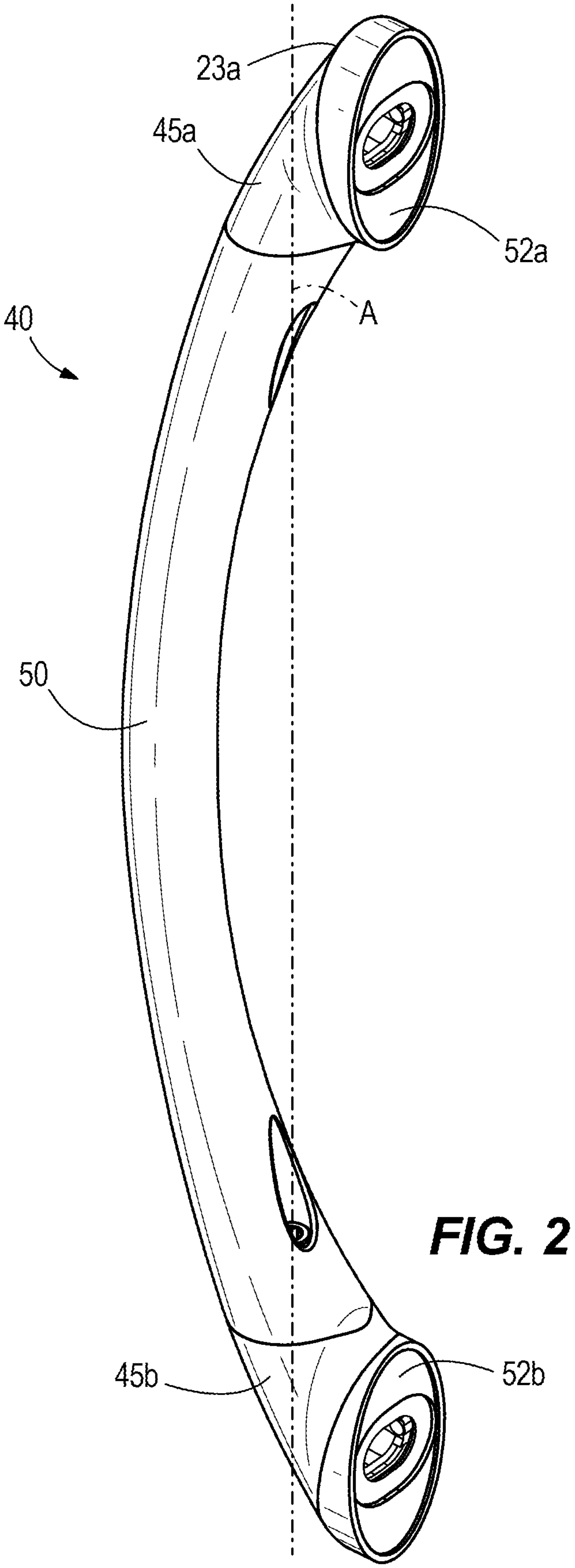
FIG. 2 is a perspective view of one handle of FIG. 1.
Figure 3:
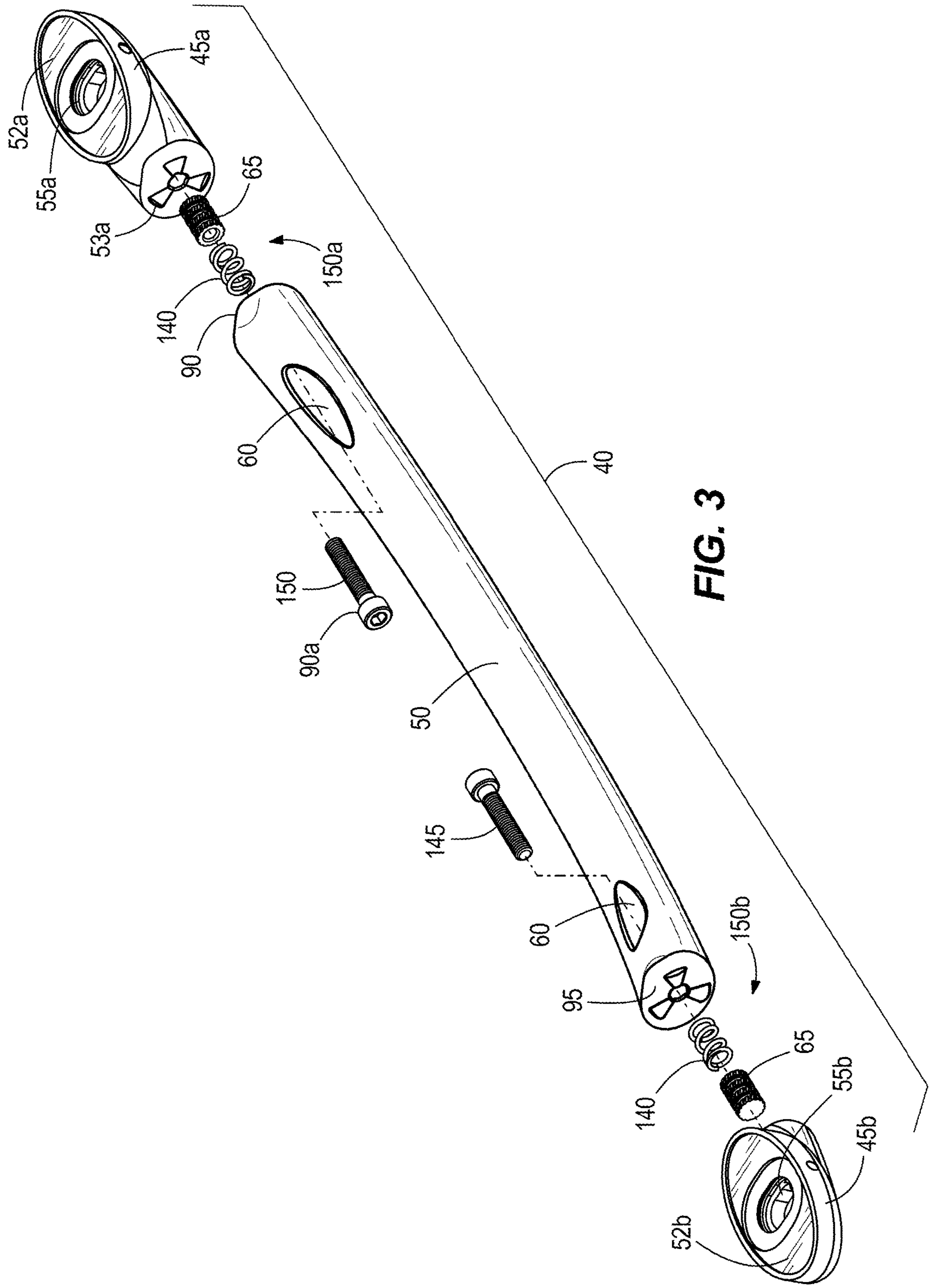
FIG. 3 is an exploded perspective view of the handle of FIG. 2 illustrating a first door mount, a second door mount, and a handle section.

As shown in FIG. 1, each door 25 includes a handle 40 to facilitate opening and closing the door 25. With reference to FIGS. 2-3, the handle 40 includes door mounts 45 (e.g., a first door mount 45*a*, a second door mount 45*b*) that are disposed on opposite ends of the handle 40, and a handle section 50 that is coupled to the first and second door mounts 45*a*, 45*b* and that extends along an axis A between the first and second door mounts 45*a*, 45*b*. The first door mount 45*a* and the second door mount 45*b* include the same structure and like features are labeled in the Figures with reference numerals appended by 'a' and 'b' for the first door mount 45*a* and the second door mount 45*b*, respectively. With reference to FIGS. 3, 4A, 5B, and 6, each door mount 45 has a first end 52 that faces and that is coupled to the door panel 35 when the handle 40 is attached to the door 25, and a second end 53 that is opposite the first end 52. Each door mount 45 is defined by a curved or sloped outer profile between the first end 52 and the second end 53. The first end 52 has an attachment opening 55 that receives a door clip to attach the handle 50 to the door 25. The second end 53 has a fastener hole 60 (e.g., a blind hole) and a face or surface 62 that is substantially perpendicular to a face of the first end 52 that engages the door panel 35. As best shown in FIG. 7, a threaded insert 65 may be positioned in the fastener hole 60, although each door mount 45 may include a monolithically-formed threaded fastener hole 60.

Figure 4B:
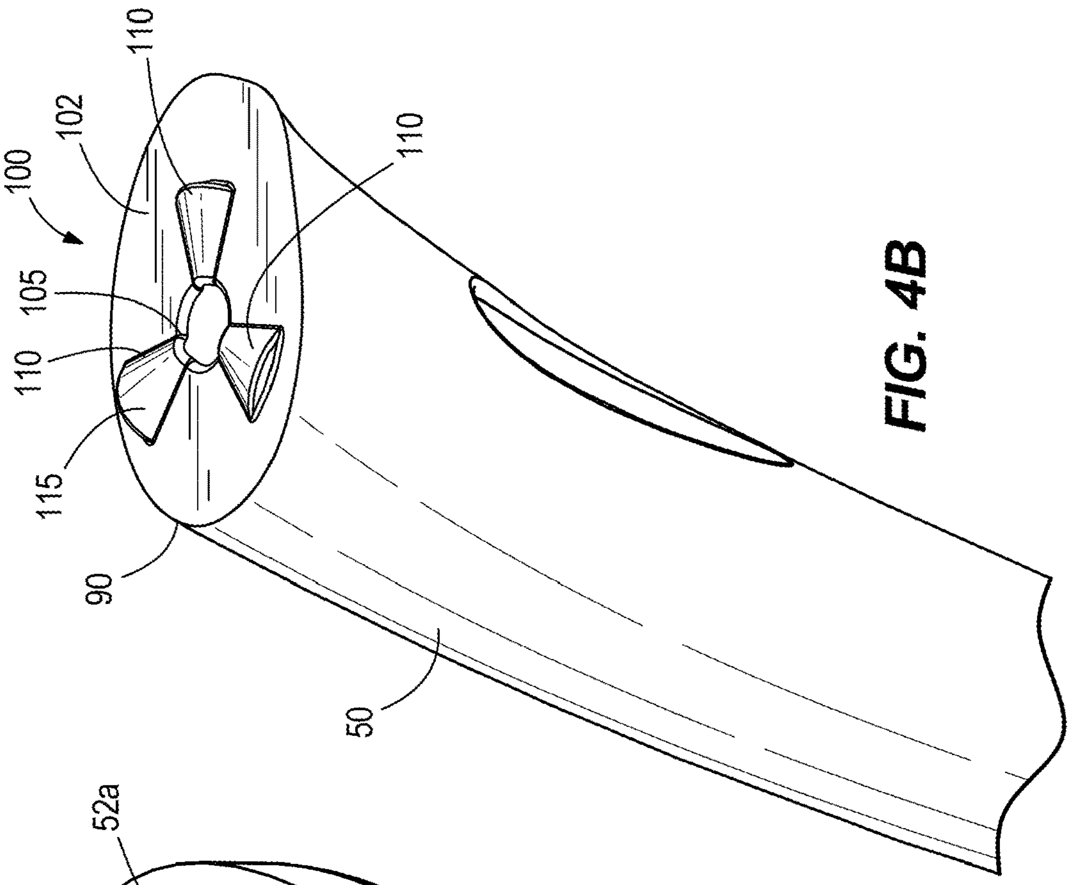
FIG. 4B is a perspective view of an upper portion of the handle section of FIG. 3.
Figure 4A:
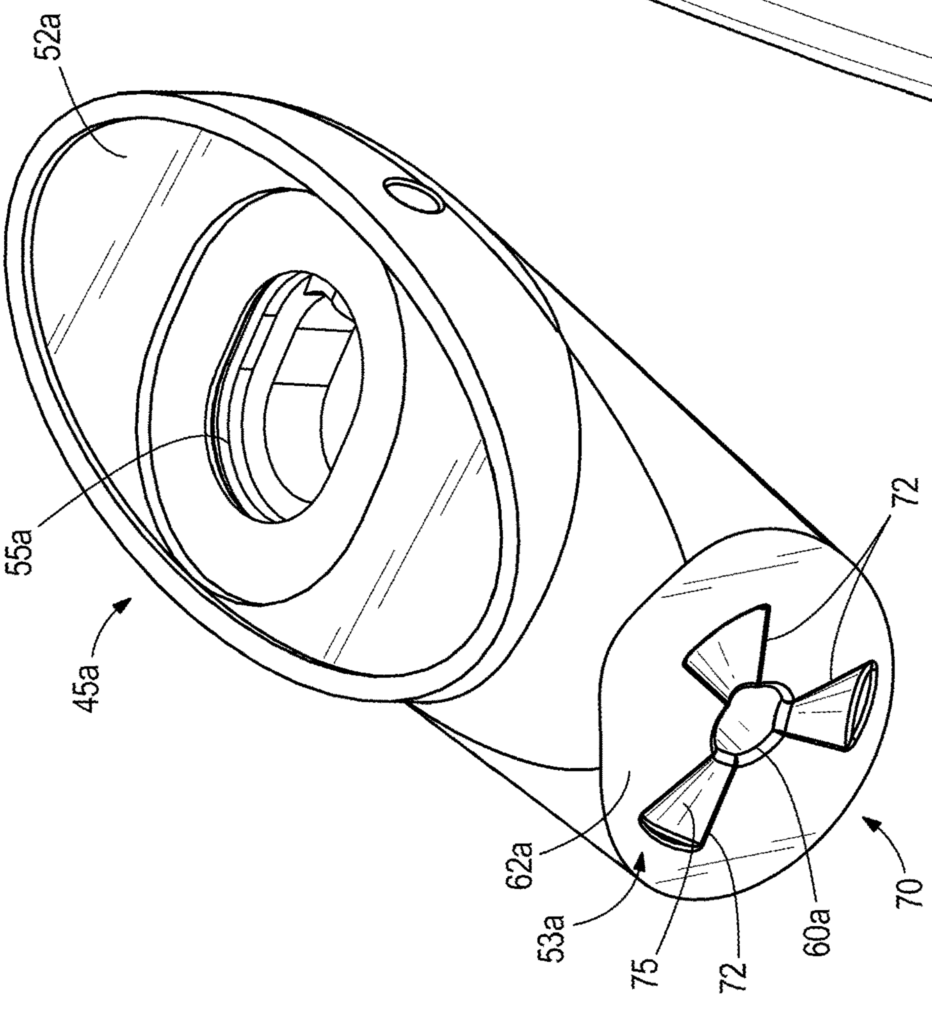
FIG. 4A is a perspective view of the first door mount of FIG. 3.

With reference to FIG. 4A, the first door mount 45*a* includes a first mating feature 70 that is disposed on the second end 53*a* relative to the surface 62*a*. As illustrated, the first mating feature 70 takes the form of recesses 72 (e.g., three recesses are shown) that are disposed circumferentially around the fastener hole 60*a*. Each recess 72 has a scalloped form or profile such that the bottom of the recess 72 is defined by a curved or sloped surface 75. It will be appreciated that the first mating feature 70 may have fewer than three or more than three recesses 72. The first mating feature 70 also may take other forms (e.g., as one or more projections, other shapes, etc.), including a combination of recesses and projections.

Figure 5B:
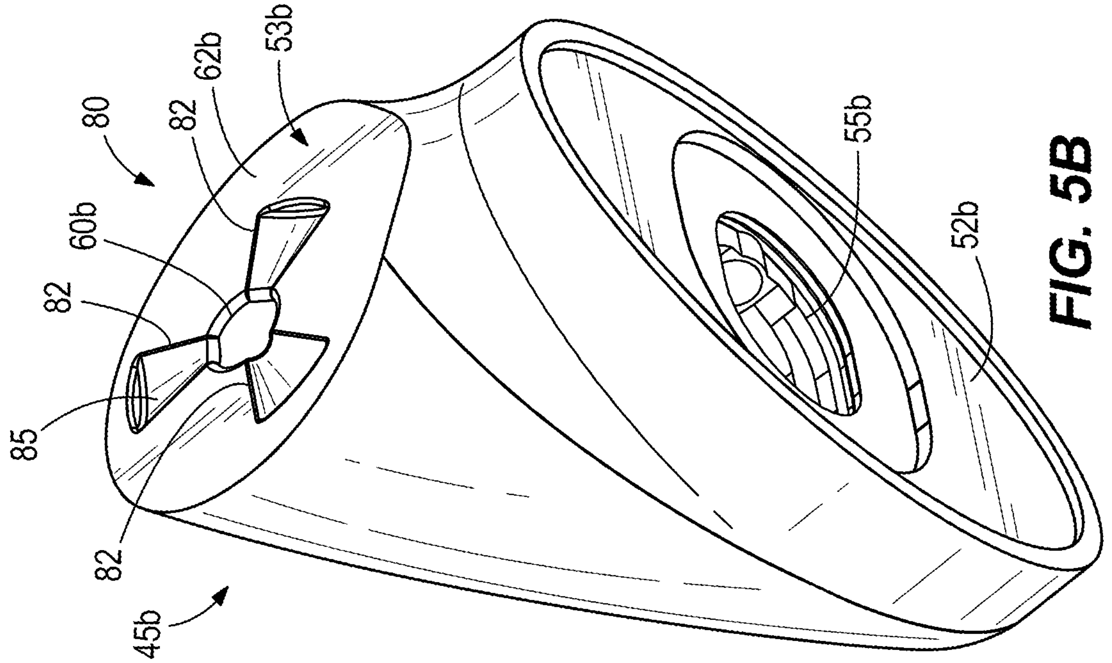
FIG. 5B is a perspective view of the second door mount of FIG. 3.

With reference to FIG. 5B, the second door mount 45*b* includes a second mating feature 80 that is disposed on the second end 53*b* relative to the surface 62*b*. As illustrated, the second mating feature 80 takes the form of recesses 82 (e.g., three recesses are shown) that are disposed circumferentially around the fastener hole 60*b*. Each recess 82 has a scalloped form or profile such that the bottom of the recess 82 is defined by a curved or sloped surface 85. It will be appreciated that the second mating feature 80 may have fewer than three or more than three recesses 82. The second mating feature 80 also may take other forms (e.g., as one or more projections, other shapes, etc.), including a combination of recesses and projections.

Figure 5A:
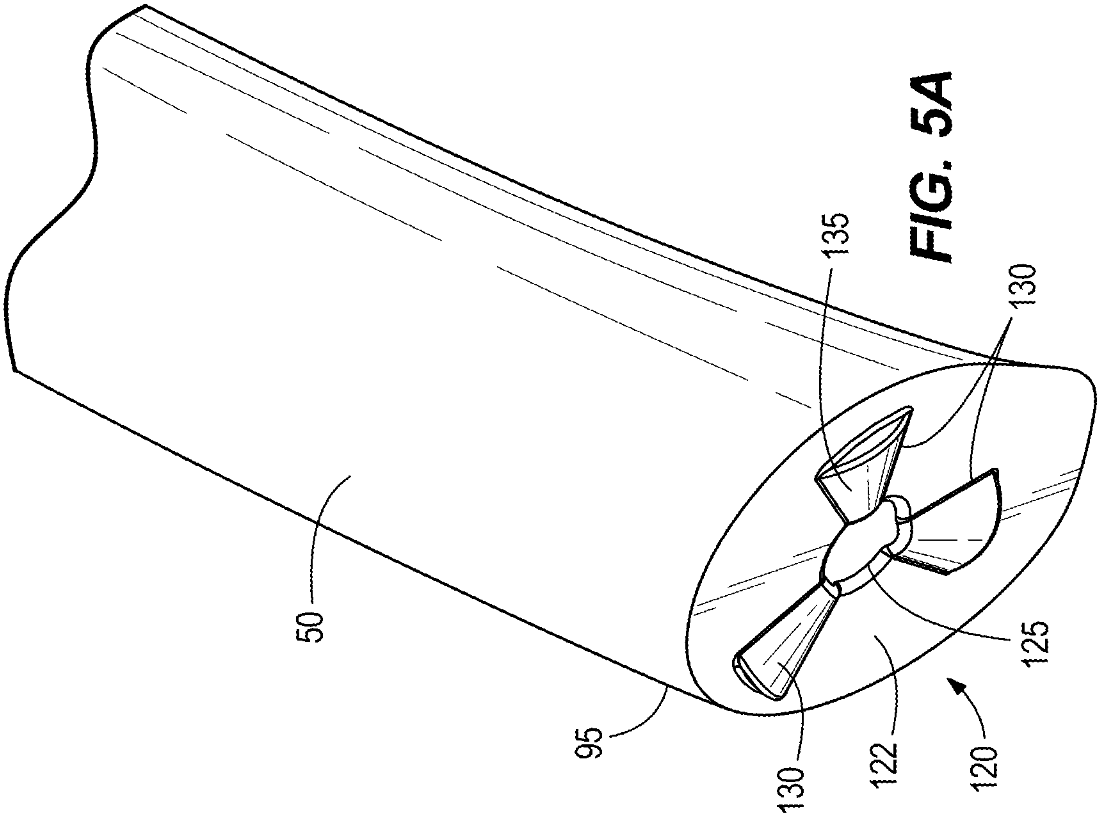
FIG. 5A is a perspective view of a lower portion of the handle section of FIG. 3.
Figure 6:
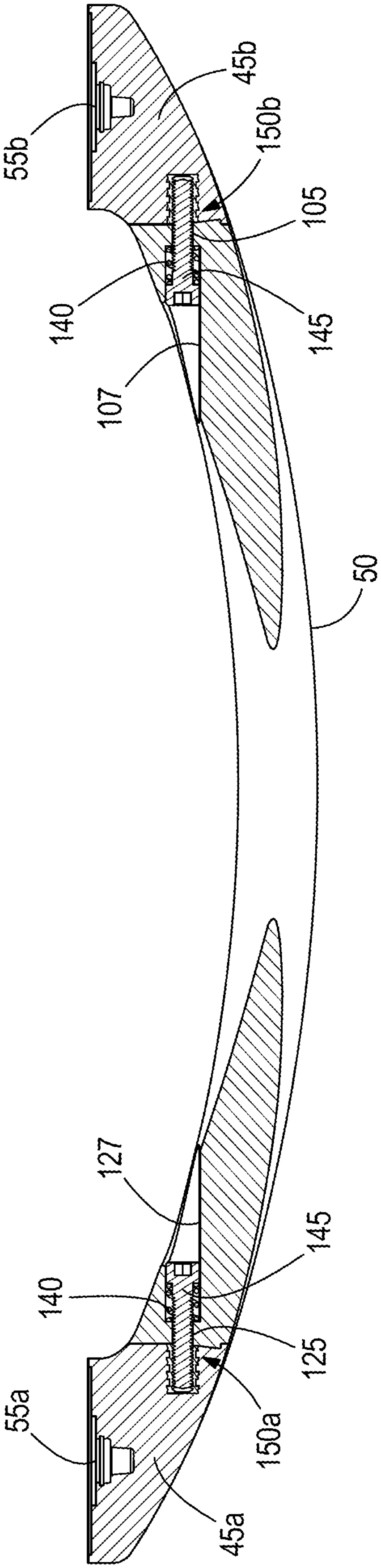
FIG. 6 is a section view of the handle along an axis A.
Figure 7A:
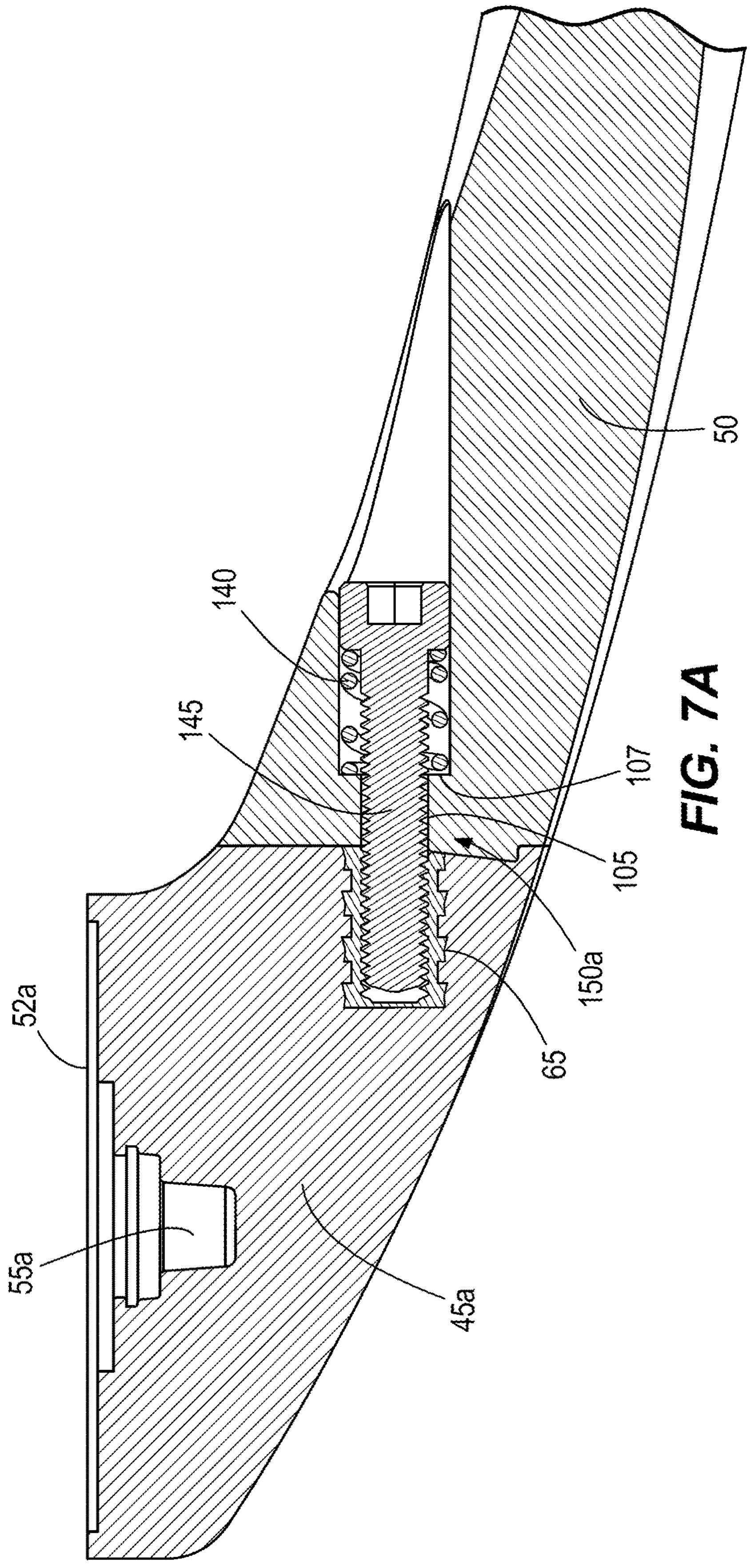
FIG. 7A is a section view of an upper part of the handle including a fastener mechanism attaching the handle section to the first door mount and defining a hinge connection.

As shown in FIGS. 2, 3, 4B, 5A, and 6 the handle section 50 is defined by a body with a curved or sloped profile. The handle section 50 includes an upper end 90 and a lower end 95 that is opposite the upper end 90. The upper and lower ends 90, 95 are aligned with the axis A. With reference to FIGS. 4B, 6, and 7A, the upper end 90 has a third mating feature 100 that is defined on an exterior face 102 of the handle section 50, and a first hole 105 with a countersink 107 extending along the axis A through the exterior face 102. As shown in FIG. 4B, the third mating feature 100 takes the form of projections 110 (e.g., three projections are shown) that are disposed circumferentially around the first hole 105. Each projection 110 has a curved outer surface or profile 115 that generally matches or is complementary to the curvature of the sloped surface 75 of the recess 72 on the first door mount 45*a*. It will be appreciated that the third mating feature 100 may have fewer than three or more than three projections 110. The third mating feature 100 also may take other forms (e.g., one or more recesses, etc.).

With reference to FIGS. 5A and 6, the lower end 95 has a fourth mating feature 120 that is defined on an exterior face 122 of the handle section 50, and a second hole 125 with a countersink 127 extending along the axis A through the exterior face 122. As shown in FIG. 5A, the fourth mating feature 120 takes the form of projections 130 (e.g., three projections are shown) that are disposed circumferentially around the second hole 125. Each projection 130 has a curved outer surface or profile 135 that generally matches or is complementary to the curvature of the sloped surface 85 of the recess 82 on the second door mount 45*b*. It will be appreciated that the fourth mating feature 120 may have fewer than three or more than three projections 130. The third mating feature 120 also may take other forms (e.g., one or more recesses, etc.).

Figure 7B:
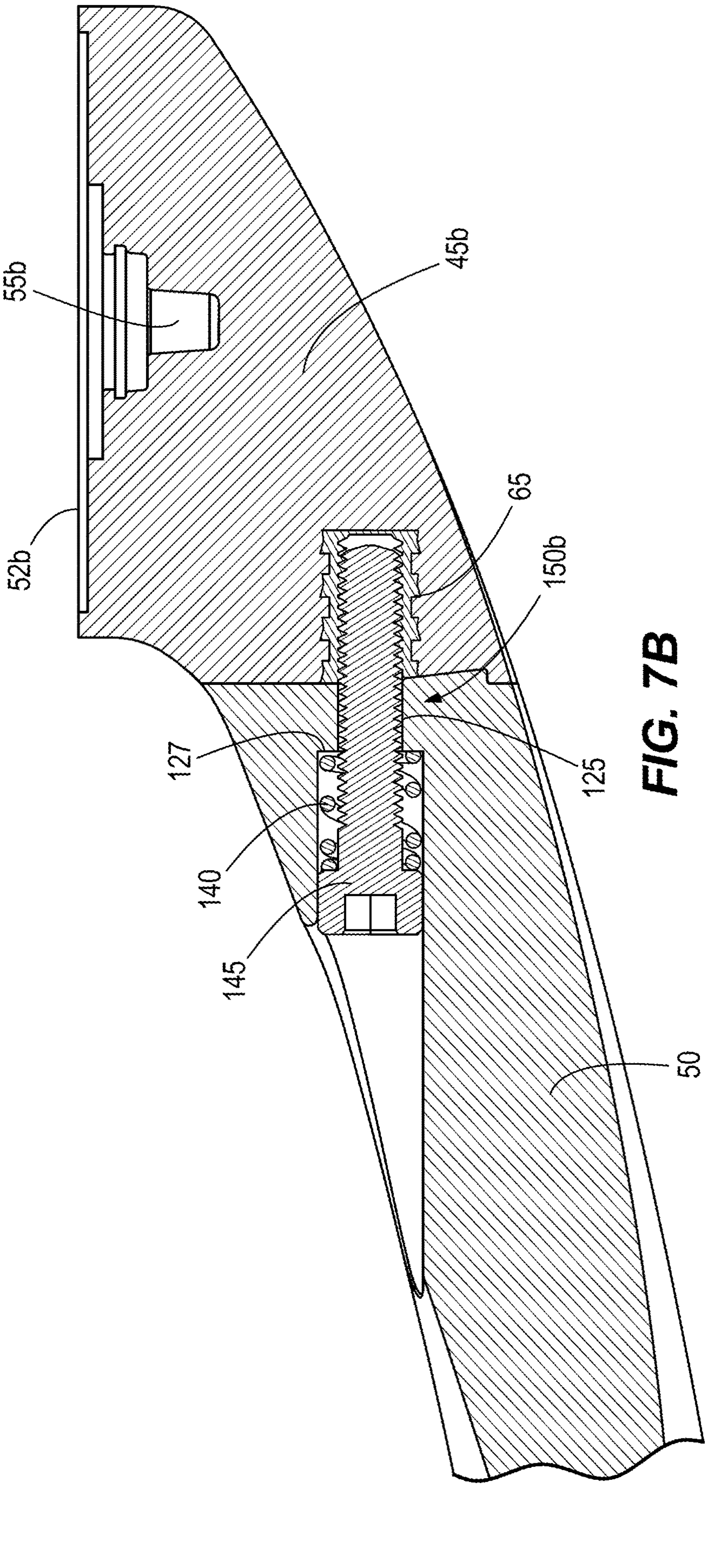
FIG. 7B is a section view of a lower part of the handle including a fastener mechanism attaching the handle section to the first door mount and defining a hinge connection.
Figure 8:
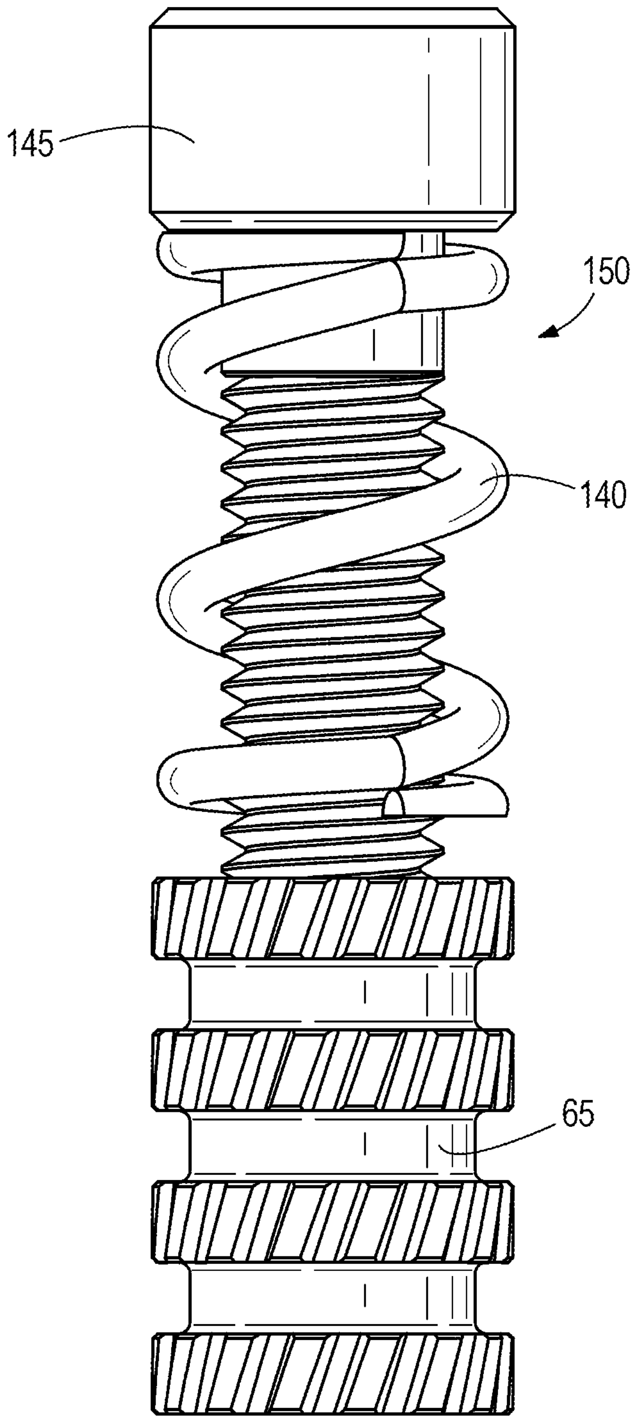
FIG. 8 is a side view of the fastener mechanism of FIG. 7.

FIG. 7A illustrates the connection between the first door mount 45*a* and the handle section 50, and FIG. 7B illustrates the connection between the second door mount 45*b* and the handle section 50. It will be appreciated that the connection between the second door mount 45*b* and the handle section 50 is the same as the connection between the first door mount 45*a* and the handle section 50. With reference to FIGS. 7A, 7B, and 8, the respective connections include a spring 140 (e.g., any form of a bias member that can flex at least longitudinally) that is positioned on the stem of a fastener 145. Each spring-fastener combination is then inserted through the first and second holes 105, 125, respectively, and threaded into the threaded insert 65 that is positioned in the corresponding fastener hole 60. Each spring 140 is positioned between the end of the countersink 107, 127 and the head of the fastener 145 so that the handle section 50 may move (e.g., pivot or rotate) relative to the first and second door mounts 45*a*, 45*b*. That is, each spring-fastener combination defines a hinge 150*a*, 150*b* between the handle section 50 and the first and second door mounts 45*a*, 45*b* along the axis A.

Figure 9A:
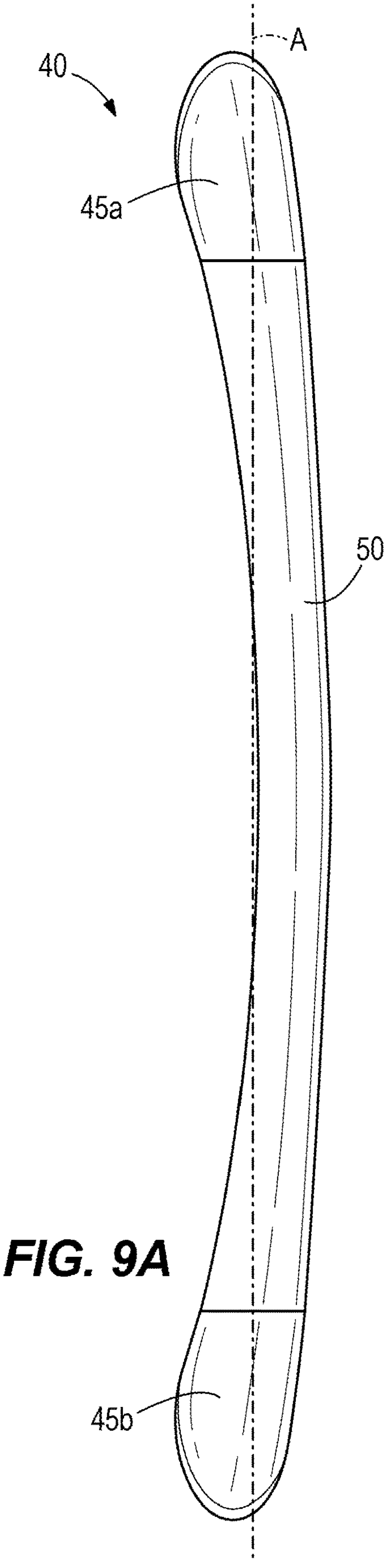
FIG. 9A is a front view of the handle in a first, non-deflected state.
Figure 9B:
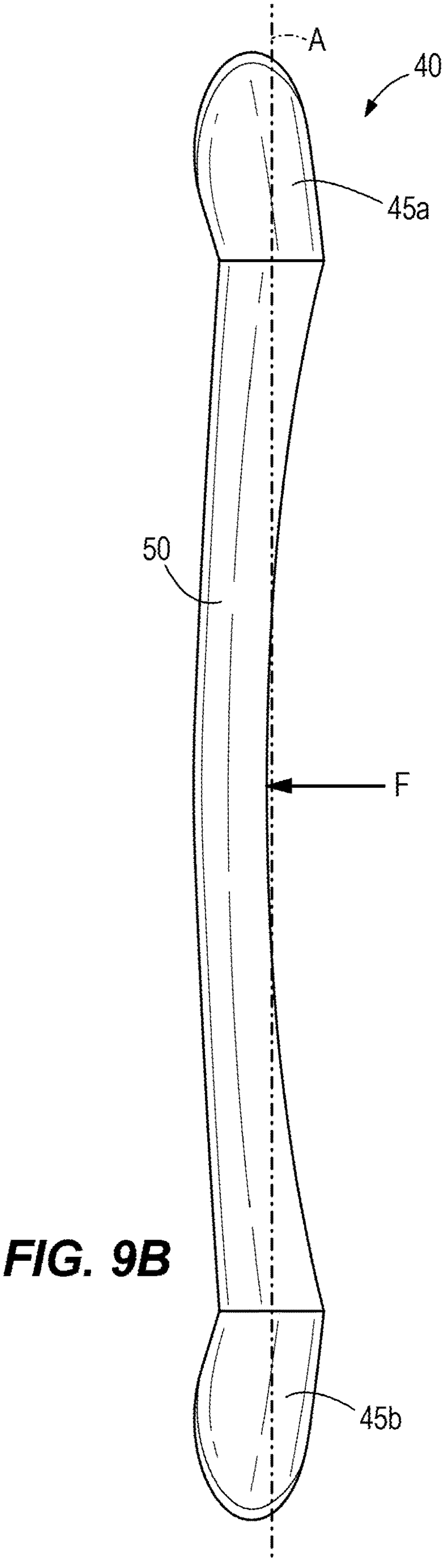
FIG. 9B is a front view of the handle in a second, deflected state.

When assembled, and as best shown in FIG. 9A, the first door mount 45*a*, the second door mount 45*b*, and the handle section 50 align with each other to cooperatively define a continuous contour that is grippable by a user to open or close the door 25. The handle 40 is in a first or aligned state when assembled, and the first and third mating features 70, 100 and the second and fourth mating features 80, 120 resist movement of the handle section 50 from the aligned state. That is, the mating features 70, 100, 80, 120 hold the handle section 50 in the aligned state absent a force acting on the handle section 50. In the aligned state, the first mating feature 70 and the third mating feature 100 are substantially or completely nested with each other, and the second mating feature 80 and the fourth mating feature 120 are substantially or completely nested with each other.

The handle section 50 is movable to a second or deflected state in response to a lateral force F acting on the handle section 50 (e.g., due to impact by an object such as a person, a cart, a hand truck, a loaded pallet, etc.) in a direction that is skewed relative to the axis A (e.g., perpendicular to the axis A, such as in the horizontal direction, or otherwise in a direction that is non-parallel to the axis A). The force F must be above a predetermined threshold to disengage the third and fourth mating features 100, 120 from the first and second mating features 70, 80, respectively. For example, impact on the handle section 50 by a shopping cart may be sufficient to overcome engagement between the projections 110, 130 and the recesses 72, 82. Deflection of the handle section 50 about the axis A via the hinges 150*a*, 150*b* prevents breakage of the door panel 35. The springs 140*a*, 140*b* between the countersinks 107, 127 and the respective fastener heads provide a flexible mechanism to allow movement of the handle section 50 relative to the first and second door mounts 45*a*, 45*b* about the hinges 150*a*, 150*b*. The sloped profile of the first door mounts 45*a*, 45*b* and the handle section 50 facilitate deflection of the impact force away from the door 25 below and above the predetermined threshold to further protect the door 25.

The hinges 150*a*, 150*b* facilitate rotational or pivotal movement of the handle section 50 between the aligned state and the deflected state. The deflected state is defined as any state or position of the handle section 50 that is unaligned with the first door mount 45*a* and the second door mount 45*b*. With reference to the illustrated example, the projections 110, 130 are partially or completely disengaged from the recesses 72, 82 in the deflected state. After the handle section 50 moves to the deflected state in response to an impact force F, the handle section 50 may be moved manually toward the aligned state. As the handle section 50 approaches the aligned state, the complementary shapes of the projections 110, 130 and the recesses 72, 82 snap the handle section 50 into the aligned state (e.g., when each projection 110, 130 overlays the respective recesses 72, 82 approximately 50%). In some constructions, the spring 140 or another spring (e.g., a torsion spring or similar device) may return the handle section 50 to the aligned state.

Although the invention has been described in detail with regard to the handle section 50 coupled to the first and second door mounts 45*a*, 45*b*, it will be appreciated that the handle section 50 may be coupled only to the first door mount 45*a* such that the handle section 50 is suspended from the first door mount 45*a*. In this example, the lower end 95 of the handle section 50 defines a free or unattached end of the handle section 50.

The invention claimed is:

1. A handle for a door, the handle comprising:

a door mount including a first end configured to couple to the door and a second end having a first mating feature; and a handle section disposed below the entirety of the door mount in a use position of the handle, the handle section coupled to the door mount by a fastener, the handle section including a third mating feature complementary to the first mating feature, wherein the handle section is in a first state in the use position, wherein the handle section is in the first state when the first mating feature and the third mating feature are engaged with each other, wherein the handle section is in a second state when the first mating feature and the third mating feature are at least partially disengaged from each other, and wherein, in response to an impact force acting on the handle section, the handle section is movable from the first state to the second state.

2. The handle of claim 1, wherein the door mount includes a hole and the handle section is coupled to the door mount by the fastener extending through the handle section into the hole.

3. The handle of claim 2, further comprising a spring positioned around a stem of the fastener to cooperatively define a hinge between the door mount and the handle section.

4. The handle of claim 2, wherein the handle section defines a countersink and the handle further includes a spring positioned between the countersink and a head of the fastener.

5. The handle of claim 1, wherein the first mating feature includes one or more of a recess or a projection or a combination thereof, and the third mating feature is complementary to the first mating feature.

6. The handle of claim 1, wherein the first mating feature includes a recess and the third mating feature includes a projection that is complementary to the recess.

7. The handle of claim 6, wherein the recess has a scalloped profile and the projection has a curved surface with a profile shaped to at least substantially nest in the recess.

8. The handle of claim 1, wherein engagement of the first mating feature and the third mating feature resists movement of the handle section toward the second state.

9. A handle comprising:

a first mount having a first mount end; and a handle section elongated along an axis and coupled to the first mount, the first mount end having a first mating feature located adjacent the handle section, the handle section coupled to and positioned below the first mount in a use position of the handle, the handle section including a first handle end and a second handle end, the first handle end having a third mating feature complementary to the first mating feature and configured to hold the handle section in a first state in which the third mating feature is aligned with the first mating feature, the handle section having a second state in which the third mating feature is unaligned with the first mating feature, the handle section movable to the second state in response to an impact force acting on the handle section in a direction skewed relative to the axis.

10. The handle of claim 9, further comprising a second mount, wherein the second mount includes a second mating feature, and wherein the second handle end of the handle section includes a fourth mating feature that is shaped complementary to the second mating feature.

11. The handle of claim 10, wherein the first mating feature includes one or more of a curved recess or a curved projection or a combination thereof, wherein the third mating feature includes a curved recess or a curved projection or a combination thereof that is complementary to the curved recess or the curved projection or the combination thereof of the first mating feature, wherein the second mating feature includes one or more of a curved recess or a curved projection or a combination thereof, and wherein the fourth mating feature includes a curved recess or a curved projection or a combination thereof that is complementary to the curved recess or the curved projection or the combination thereof of the second mating feature.

12. The handle of claim 10, wherein when the handle section is in the second state, the first mating feature and the second mating feature are at least partially disengaged relative to the third mating feature and the fourth mating feature, respectively.

13. The handle of claim 9, further comprising a second mount, wherein a first fastener extends through the handle section into the first mount and a second fastener extends through the handle section into second mount, and the axis extends through the first fastener and the second fastener.

14. The handle of claim 13, further comprising a first spring disposed on the first fastener and a second spring disposed on the second fastener, wherein the first spring and the first fastener cooperatively define a first hinge between the first mount and the handle section, and wherein the second spring and the second fastener cooperatively define a second hinge between the second mount and the handle section.

15. A handle for a door, the handle comprising:

a door mount configured to attach to the door; and a handle section extending along an axis and coupled to the door mount by a hinge disposed between the door mount and the handle section, the hinge including a fastener extending through the handle section into the door mount and a spring coupled to the fastener and disposed completely in the handle section, wherein the handle section is disposed below the entirety of the door mount and has a first state in which the handle section is aligned with the door mount and a second state in which the handle section is unaligned with the door mount, the handle section movable relative to the door mount about the hinge between the first state and the second state in response to an impact force acting on the handle section in a direction skewed relative to the axis, wherein the door mount includes a first mating feature and the handle section includes a third mating feature that is shaped complementary to the first mating feature and separate from a contour of the handle section, and wherein engagement of the first mating feature and the third mating feature resists movement of the handle section toward the second state.

16. The handle of claim 15, wherein the handle section is in the second state when the first mating feature and the third mating feature are at least partially disengaged from each other.

17. The handle of claim 16, wherein the handle section has a curved profile and is manually movable from the second state to the first state.

18. The handle of claim 15, wherein the door mount is a first door mount and the handle includes a second door mount coupled to the handle section opposite the first door mount, and wherein the second door mount includes a second mating feature and the handle section includes a fourth mating feature complementarily engaged with the second mating feature in the first state.

19. The handle of claim 15, wherein the handle section defines a countersink and the spring is positioned between the countersink and a head of the fastener.

* * * * *